(12) United States Patent
Kim et al.

(10) Patent No.: US 8,754,958 B2
(45) Date of Patent: Jun. 17, 2014

(54) METHOD OF ADJUSTING WHITE BALANCE OF IMAGE, RECORDING MEDIUM HAVING PROGRAM FOR PERFORMING THE METHOD, AND APPARATUS APPLYING THE METHOD

(75) Inventors: Kyoung-jae Kim, Suwon-si (KR); Yong-gi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 12/708,642

(22) Filed: Feb. 19, 2010

(65) Prior Publication Data

US 2010/0214436 A1    Aug. 26, 2010

(30) Foreign Application Priority Data

Feb. 20, 2009    (KR) ................. 10-2009-0014410

(51) Int. Cl.
*H04N 9/73* (2006.01)
*H04N 5/235* (2006.01)
*H04N 5/222* (2006.01)

(52) U.S. Cl.
USPC ............... 348/223.1; 348/221.1; 348/333.05

(58) Field of Classification Search
USPC ............................ 348/223.1, 333.09, 333.12
See application file for complete search history.

(56) References Cited

U.S. PATENT DOCUMENTS

| | | | |
|---|---|---|---|
| 6,344,907 B1 * | 2/2002 | Watanabe et al. | 358/448 |
| 6,958,773 B1 * | 10/2005 | Sato | 348/223.1 |
| 7,324,749 B2 * | 1/2008 | Kubo | 396/429 |
| 7,551,208 B2 * | 6/2009 | Abe | 348/223.1 |
| 7,656,451 B2 * | 2/2010 | Yanagi | 348/333.11 |
| 7,720,258 B1 * | 5/2010 | Ullmann | 382/103 |
| 7,777,784 B2 * | 8/2010 | Bloom et al. | 348/222.1 |
| 7,839,436 B2 | 11/2010 | Hamamura | |
| 7,978,248 B2 * | 7/2011 | Terashima | 348/333.05 |
| 8,040,412 B2 * | 10/2011 | Yamamoto | 348/273 |
| 2002/0130959 A1 * | 9/2002 | McGarvey | 348/223 |
| 2003/0122951 A1 * | 7/2003 | Hara et al. | 348/333.02 |
| 2003/0146984 A1 | 8/2003 | Sakaguchi et al. | |

(Continued)

FOREIGN PATENT DOCUMENTS

| | | |
|---|---|---|
| JP | 2003-304546 A | 10/2003 |
| JP | 2006-074710 A | 3/2006 |
| JP | 2008-072297 A | 3/2008 |

OTHER PUBLICATIONS

Office Action established for CN 201010119512.1 (Aug. 1, 2013).

(Continued)

*Primary Examiner* — Tuan Ho
*Assistant Examiner* — Selam Gebriel
(74) *Attorney, Agent, or Firm* — Drinker Biddle & Reath LLP

(57) ABSTRACT

A white balance adjusting apparatus and method generate a display image by performing display image signal processing to an input image, specify an area of the display image, output at least two sample images by applying at least two types of correction gains to the area of the display image, and apply the correction gain that is applied to one of the at least two sample images to the input image. Accordingly, a white subject does not have to be searched for to adjust white balance, and an image having a color sensitivity desired by the user can be obtained by performing white balance on colors other than white.

21 Claims, 9 Drawing Sheets

(56) References Cited

U.S. PATENT DOCUMENTS

| | | | |
|---|---|---|---|
| 2005/0128316 A1* | 6/2005 | Sugimori | 348/223.1 |
| 2005/0212819 A1* | 9/2005 | Kubo et al. | 345/619 |
| 2006/0081760 A1* | 4/2006 | Kikuchi | 250/201.5 |
| 2006/0087566 A1* | 4/2006 | Abe | 348/223.1 |
| 2007/0058064 A1* | 3/2007 | Hara et al. | 348/333.01 |
| 2007/0065137 A1* | 3/2007 | Hara et al. | 396/291 |
| 2009/0027515 A1* | 1/2009 | Maruyama et al. | 348/223.1 |
| 2009/0180002 A1* | 7/2009 | Suekane | 348/223.1 |

OTHER PUBLICATIONS

Office Action issued for CN 201010119512.1 (Mar. 7, 2014).

* cited by examiner

METHOD OF ADJUSTING WHITE BALANCE OF IMAGE, RECORDING MEDIUM HAVING PROGRAM FOR PERFORMING THE METHOD, AND APPARATUS APPLYING THE METHOD

CROSS-REFERENCE TO RELATED PATENT APPLICATION

This application claims the priority benefit of Korean Patent Application No. 10-2009-0014410, filed on Feb. 20, 2009, in the Korean Intellectual Property Office, the disclosure of which is incorporated herein in its entirety by reference.

BACKGROUND

1. Field of the Invention

The present invention relates to a method of adjusting white balance of an image, a computer readable storage medium having stored thereon a program executable by a processor for performing the method, and a digital apparatus for executing the method.

2. Description of the Related Art

In conventional digital cameras, which is one kind of digital apparatus, methods of adjusting white balance may be classified as the following three modes: automatic white balance control mode, preset white balance control mode, and manual white balance control mode.

In the manual white balance control mode of conventional digital cameras, a nearby white subject such as white paper is searched for to adjust white balance that is appropriate for a particular circumstance.

Accordingly, the manual white balance control mode always requires a white subject. However, the user may not obtain desired color sensitivity in other colors than white when the manual white balance control mode is used.

SUMMARY

Embodiments of the present invention include a method of adjusting white balance in which a white subject does not need to be searched for in order to adjust white balance, but images having desired color sensitivity can be obtained by adjusting white balance of colors other than white.

According to an aspect of the present invention, a method of adjusting white balance comprises generating a display image by performing display image signal processing to an input image, specifying an area of the display image, outputting at least two sample images by applying at least two types of correction gains to the area of the display image, and applying the correction gain that is applied to one of the at least two sample images to the input image.

The method may further comprise performing display image signal processing to a first input image to generate and display a first display image, specifying an area of the first display image, outputting at least two sample images by applying at least two types of correction gains to the area of the first display image, and performing display image signal processing to a second input image and the at least two sample images to generate and display a second display image.

The method may further comprise applying the correction gain to a third input image to generate a third display image.

The method may further comprise selecting one of the at least two sample images.

The method may further comprise outputting a representative color having a largest surface area of the specified area of the display image, and outputting at least two sample images to which at least two types of correction gains are applied with respect to an image of the specified area of the display image that displays the output representative color.

The at least two sample images may be output from a database in which a plurality of sample images to which different correction gains are applied with respect to an image having a plurality of colors are stored.

According to another aspect of the present invention, a computer readable storage medium may have stored thereon a computer program executable by a processor for performing a method of adjusting white balance as described above.

According to another aspect of the present invention, a white balance adjusting apparatus comprises a display image processing unit that performs display image signal processing to an input image to generate a display image, an area set up unit that specifies an area of the display image, a sample image output unit that outputs at least two sample images to which at least two types of correction gains are applied with respect to the area of the display image, and a white balance adjusting unit that applies the correction gain that is applied to one of the at least two sample images to the input image.

The white balance adjusting apparatus may further comprise an imaging device that inputs the input image.

The imaging device may input a first input image, and the display image processing unit may perform display image signal processing to the first input image to generate a first display image, and the area set up unit may specify an area of the first display image.

The imaging device may input a second input image, and the display image processing unit may perform display image signal processing to the second input image and the sample images to generate a second display image.

The imaging device may input a third input image, and the white balance adjusting unit may apply the correction gain to the third input image, and the display image processing unit may perform display image signal processing to the third input image, to which the correction gain is applied, to generate a third display image.

The white balance adjusting apparatus may further comprise a display unit that displays the display image.

The white balance adjusting apparatus may further comprise a representative color outputting unit that outputs a representative color having a largest surface area of the display image.

The white balance adjusting apparatus may further comprise a database in which a plurality of sample images, to which different correction gains are applied with respect to an image having a plurality of colors, are stored.

The sample image output unit may output the at least two sample images from the database.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

A white balance adjusting apparatus, according to an embodiment of the present invention, that is used, for example, in a digital camera will be described. However, the white balance adjusting apparatus is not limited to use in digital cameras and may also be used in phones with cameras, personal digital assistants (PDAs), portable multimedia players (PMPs), and so forth, which include a white balance adjusting function.

Figure 1:
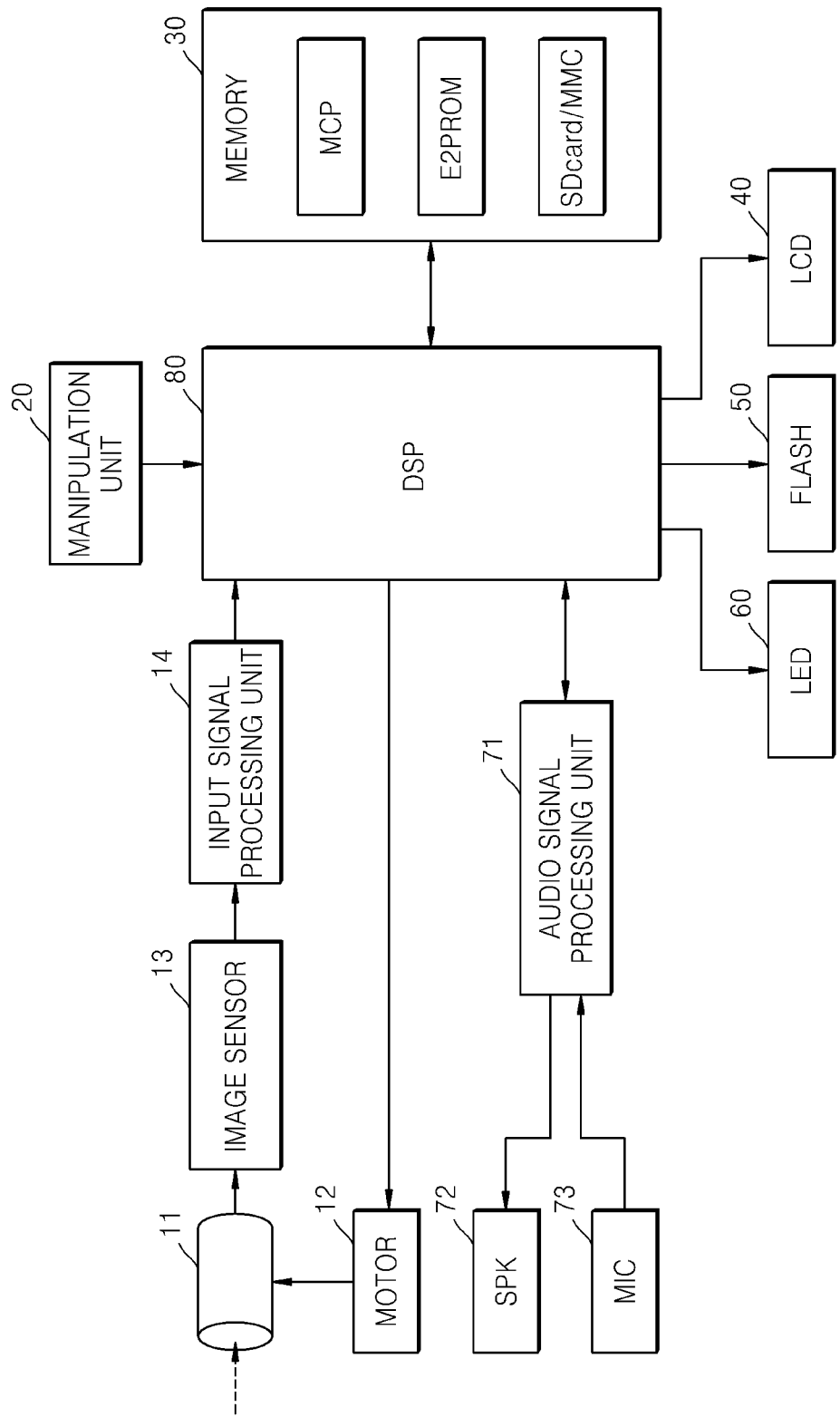
FIG. 1 is a block diagram illustrating a digital camera including a white balance adjusting apparatus according to an embodiment of the present invention.

FIG. 1 is a block diagram illustrating a digital camera including a white balance adjusting apparatus according to an embodiment of the present invention. Referring to FIG. 1, the digital camera includes an optical unit 11, a motor 12 that drives the optical unit 11, an image sensor 13 that converts an optical signal that is input through the optical unit 11 to an electrical signal, and an input signal processing unit 14 that performs signal processing such as noise reduction, digital signal conversion, etc., on the electrical signal supplied from the image sensor 13. Also, the digital camera includes a manipulation unit 20 that inputs a manipulation signal of a user and a memory 30 that stores data or algorithms for calculations. In addition, a liquid crystal display (LCD) 40 is mounted in the digital camera as a display device. Also, a flash 50 that provides an amount of light and a light emitting diode (LED) 60 that displays the status of the digital camera are included in the digital camera. The digital camera may further include an audio signal processing unit 71 that converts sound into a digital signal or a digital signal of a sound source into an analog signal, a speaker 72 for outputting sound, and a microphone 73 for inputting sound. Also, the digital camera includes a digital signal processor (DSP) 80 that controls the overall operations of the digital camera and performs image signal processing on an input image.

The elements of the digital camera will hereinafter be described in detail.

The optical unit 11 may include a lens which focuses an optical signal, an aperture which controls an amount of the optical signal (light amount) which reaches the image sensor 13, and a shutter controlling input of the optical signal. The lens may include a zoom lens that controls an angle of view to be narrow or wide according to a focal length, and/or a focus lens that adjusts a focus of a subject. The lens may be a single lens or a group of lenses. A mechanical shutter over which a cover moves up and down may be used as the shutter. Alternatively, instead of installing a shutter device, the function of a shutter may be conducted by controlling the supply of an electrical signal to the image sensor 13.

The motor 12 which drives the optical unit 11 may adjust the position of the lens, may open or close the aperture, or may operate the shutter in order to perform auto-focusing, automatic exposure control, aperture control, zooming, focusing, and so forth. The motor 12 receives a control signal from the DSP 80 to control the operation of the optical unit 11.

The image sensor 13 receives an optical signal from the optical unit 11 to form an image of a subject. Examples of the image sensor 13 include a complementary metal-oxide semi-conductor (CMOS) sensor array, a charge-coupled device (CCD) sensor array, etc.

The input signal processing unit 14 may further include an analog-to-digital (A/D) converter that digitalizes an electrical signal, which is an analog signal and supplied from a CCD. Also, the input signal processing unit 14 may include a circuit that adjusts a gain or standardizes a waveform of the electrical signal supplied from the image sensor 13.

The manipulation unit 20 may include elements for the user to manipulate the digital camera or may set various functions during photographing. For example, the manipulation unit 20 may include elements such as buttons, keys, touch panels, touch screens, dials, etc. User control signals such as power on/off, photographing start/stop, replay start/stop/ search, operation of an optical system, mode conversion, menu manipulation, selection manipulation, and so forth may be input using the elements of the manipulation unit 20.

The memory 30 may include a multi-chip package (MCP) for temporarily storing data of an input image, data for calculations, processing results, etc., an electrically erasable programmable read-only memory (E2PROM) for storing algorithms required for operations of the digital camera or set up data, and a secure digital (SD) card/MultiMediaCard (MMC) as a recording device for storing image files.

The MCP temporarily stores RAW data (RGB data) of an image provided from the input signal processing unit 14. A predetermined image signal processing may be performed to the temporarily stored RAW data according to a calculation of the DSP 80 or the RAW data may be transmitted to other elements such as the memory. In addition, the MCP may convert data constituting the algorithms stored in the E2PROM to executable data and store the same temporarily. By calculating in the DSP 80 using the data stored in the MCP, an operation according to the algorithms may be performed. Also, image data which is converted by decompressing an image file stored in the E2PROM may be temporarily stored in the MCP. The temporarily stored image data is transmitted to the LCD 40 to display a predetermined image. The MCP may be a volatile memory of various types such as a dynamic random access memory (DRAM) or synchronous DRAM (SDRAM), which temporarily stores data while power is being supplied.

The E2PROM may store operation systems needed to operate the digital camera, application programs, data executing algorithms of methods of adjusting white balance according to the present invention, and so forth. Examples of the E2PROM include various non-volatile memories such as a flash memory, read-only memory (ROM), etc.

In the SD card/MMC, image files that are generated by compressing the image data supplied from the input signal processing unit 14 may be stored. Examples of the SD card/ MMC include a flash memory, hard disk drive (HDD), an optical disk, an optical magnetic disk, a hologram memory, etc.

The LCD 40 may realize an image corresponding to the image data provided from the input signal processing unit 14, or may display an image corresponding to image data restored from an image file stored in the SD card/MMC.

However, the display device according to the current embodiment of the present invention is not limited to the LCD 40, and an organic electroluminescent display apparatus, an electrophoresis display apparatus, etc., may also be used.

The audio signal processing unit 71 converts a digital signal of a sound source from the DSP 80 into sound and amplifies and transmits the sound to the speaker 72 to be output. Alternatively, sound may be input through the microphone 73, and the sound may be converted into a digital signal and compressed to an audio file. Then the audio file may be transmitted to the DSP 80 to be calculated.

The DSP 80 may reduce noise of input image data, and may perform image signal processing for improving image quality, such as gamma correction, color filter array interpolation, color matrix, color correction, color enhancement, etc. Also, the generated image data may be compressed to an image file by image signal processing for improving image quality, or the image data may be restored from the image file. The compression type of an image may be reversible or irreversible. Examples of appropriate compression type may be a joint photographic experts group (JPEG) or JPEG 2000. Also, the DSP 80 may perform functions of obscure processing, coloring, blurring, edge emphasis, image interpreting, image recognition, image effect, etc. Examples of the image recognition include face recognition or scene recognition. Also, the DSP 80 may perform display image signal processing to display the image on the LCD 40. For example, luminance level control, color correction, contrast control, edge emphasis control, screen split, character image, and so forth, or synthesis of images may be performed. The DSP 80 may be connected to an external monitor and perform predetermined display image signal processing so that image data is displayed on the external monitor. That is, the DSP 80 may control the image data to be transmitted to the external monitor and be displayed on the external monitor.

The DSP 80 may perform the above-described display image signal processing, and may control the elements of the digital camera according to the results of the display image signal processing. Also, the DSP 80 may control each of the elements according to a control signal of the user, which is input through the manipulation unit 20. Algorithms for performing the display image signal processing are stored in the E2PROM, and they are converted into executable data for calculations and stored in the memory 30. Thus, the DSP 80 may perform calculations for display image signal processing according to the algorithms.

The controlling operation of the DSP 80 will be described in detail with reference to FIG. 2 or 3.

Figure 2:
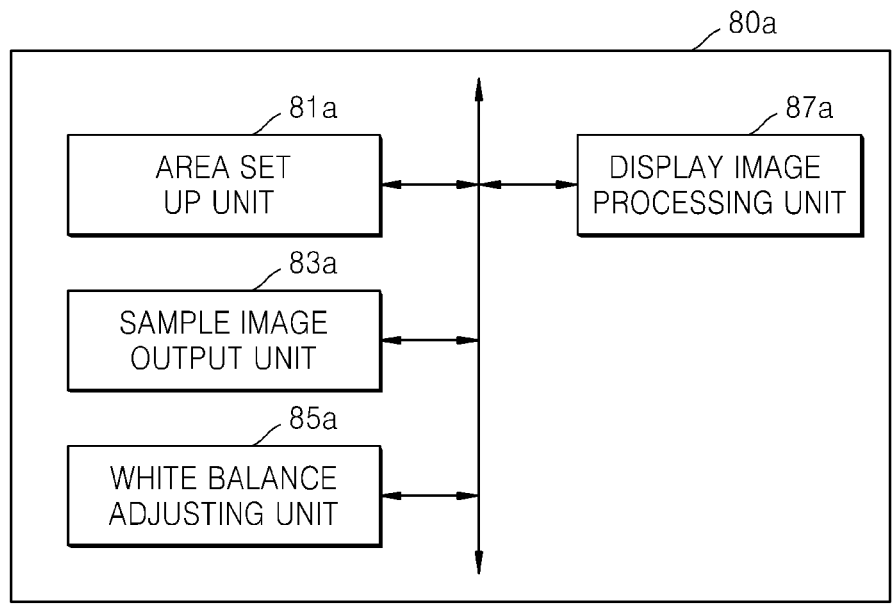
FIG. 2 is a block diagram illustrating a digital signal processor (DSP) of the digital camera of FIG. 1, according to an embodiment of the present invention.

FIG. 2 is a block diagram illustrating a DSP 80a of the digital camera of FIG. 1, according to an embodiment of the present invention.

Referring to FIG. 2, the DSP 80a includes an area set up unit 81a, a sample image output unit 83a, a white balance adjusting unit 85a, and a display image processing unit 87a.

The area set up unit 81a sets up an area of an input image displayed on the LCD 40 of FIG. 1, by displaying a selection frame on the input image. An area of the input image may be selected by placing the selection frame on the area. Alternatively, the area may be automatically set up as an area including a predetermined object by the above-described image recognition such as face recognition and scene recognition.

The sample image output unit 83a generates sample images by applying at least two correction gains to the selected area of the input image. For example, a first sample image may be generated by applying a first correction gain to the area of the input image, and a second sample image may be generated by applying a second correction gain, which is different from the first correction gain, to the area of the input image.

Then the white balance adjusting unit 85a selects one of the first and second sample images, and applies a correction gain corresponding to the selected sample image to the whole input image. For example, if the first sample image is selected, the first correction gain corresponding to the first sample image is applied to the whole input image to adjust white balance.

The display image processing unit 87a performs the above-described display image signal processing on the input image to generate a display image, and provides the display image to the LCD 40. The display image processing unit 87a performs predetermined display image signal processing to the input image in order to display the input image which is input in real-time. A first display image may be generated by performing display image signal processing to a first input image. By displaying the first display image on the LCD 40, the user may set up an area for adjusting white balance. That is, the user may check the first display image displayed on the LCD 40 to set up an area as a reference for white balance control. The area may also be set up automatically by image recognition. Also, the display image processing unit 87a may perform display image signal processing on the sample images of the selected area and a second input image, thereby generating a second display image that is also displayed on the LCD 40. The second input image may be input after the first input image or may be the same image as the first input image. Also, the user may select one sample image through the second display image and apply a correction gain which is applied to the selected sample image, to the second input image, and perform display image signal processing to the second input image to which the correction gain is applied in the display image processing unit 87a, to generate a third display image. The second input image to which the correction gain is applied may be a third input image that is input after the second input image, and may also be the same as the first input image or the second input image. White balance is performed to the third display image, and the third display image may be displayed on the LCD 40.

Figure 3:
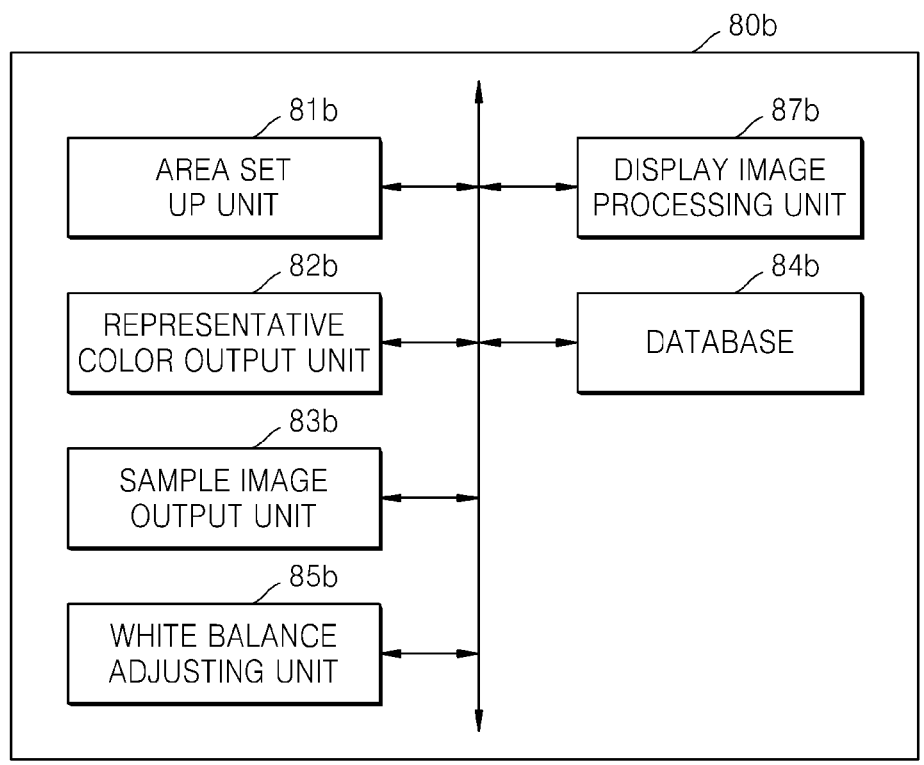
FIG. 3 is a block diagram illustrating a DSP of the digital camera of FIG. 1, according to another embodiment of the present invention.

FIG. 3 is a block diagram illustrating a DSP 80b of the digital camera of FIG. 1, according to another embodiment of the present invention. The DSP 80b is similar to the DSP 80a illustrated in FIG. 2 in that sample images are generated and white balance is performed using a correction gain applied to the selected sample images. However, the type of the sample images is different. Hereinafter, the description will focus on the differences of the DSP 80b from the DSP 80a of FIG. 2.

Referring to FIGS. 1 and 3, the DSP 80b includes an area set up unit 81b, a representative color output unit 82b, a sample image output unit 83b, a white balance adjusting unit 85b, and a display image processing unit 87b.

The area set up unit 81b sets up an area of an input image displayed on the LCD 40 of FIG. 1.

The representative color output unit 82b outputs a representative color of the area. The representative color may be a color having a largest surface area among the area. The representative color may not be necessarily white. The representative color may be output from the area based on preset standards set by the user or the manufacturer using various methods.

The sample image output unit 83b may generate at least two sample images to which at least two types of correction gains are applied, with respect to the input image displaying the representative color. For example, if red is set as the representative color, red sample images having various color sensitivities may be output by applying different correction gains to the sample images.

White balance is performed by applying the correction gain, which is applied to the selected sample image among the sample images output from the white balance adjusting unit 85*b*, to the input image.

The display image processing unit 87*b* performs display image signal processing on the input image to generate a display image, and provides the display image to the LCD 40. In detail, display image signal processing is performed to a first input image to generate a first display image. Also, display image signal processing is performed on sample images generated from an area of the first display image and to a second input image, to generate a second display image. Furthermore, the correction gain applied to the selected sample image may be applied to a third input image to perform white balance to the third input image. Next, by performing display image signal processing to the third input image, a third display image may be generated. The first input image, the second input image, and the third input image may be the same images or different images that are input sequentially. The first input image, the second input image, and the third input image may be displayed on the LCD 40. The third display image has color sensitivity desired by the user since white balance is performed thereto.

Also, the DSP 80*b* may further include a database 84*b* that includes sample images displaying different color sensitivities of different colors. In the database 84*b*, a plurality of sample images, to which different correction gains with respect to an image having a plurality of colors are applied, may be stored. For example, a plurality of sample images having color sensitivities with respect to red and blue and correction gains corresponding to the sample images may be stored in the database 84*b*. Accordingly, if red is set as the representative color, red sample images displaying various color sensitivities of the red color may be output from the database 84*b*.

By using the DSPs 80*a* and 80*b* according to the above embodiments, the user can directly check the color sensitivity and adjust white balance so as to generate images having desired color sensitivity.

Figure 4:
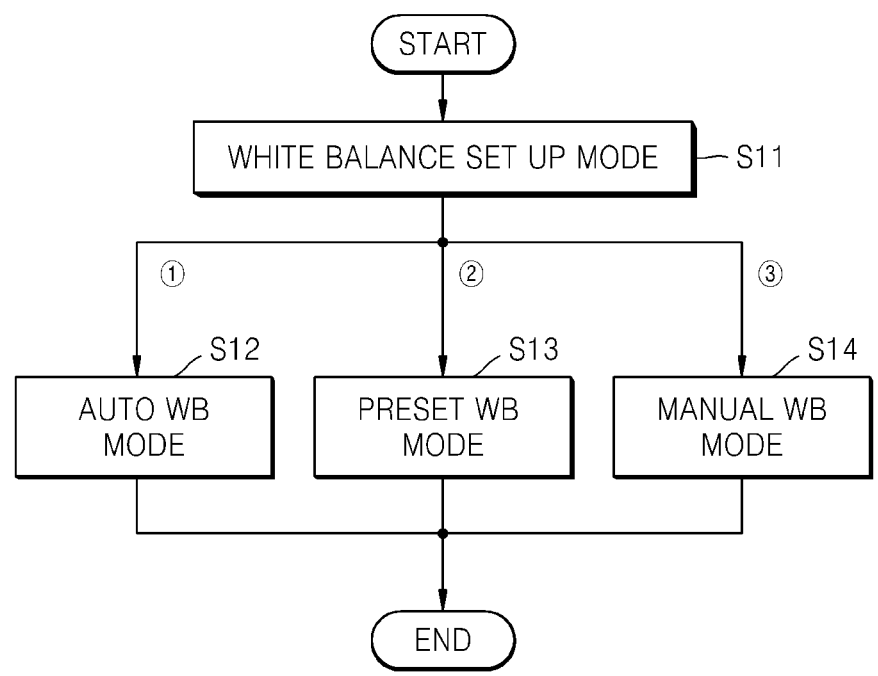
FIG. 4 is a flowchart illustrating a method of selecting a manual white balance control mode in order to apply a method of adjusting white balance according to an embodiment of the present invention.

FIG. 4 is a flowchart illustrating a method of selecting a manual white balance control mode in order to apply a method of adjusting white balance according to an embodiment of the present invention.

For example, in a digital camera, a white balance adjusting apparatus may be in a white balance set up mode among the setup menus. Thus, first, a white balance set up mode is set in operation S11. Then one of an automatic white balance control mode (operation S12), a preset white balance control mode (operation S13), and a manual white balance control mode (operation S14) may be selected by the user through a manipulation unit. In the preset white balance control mode, specific examples of white balancing under various lighting conditions such as a fluorescent lamp, natural light (sunlight), cloudy (shade), a tungsten bulb, etc., are stored in advance, and the user selects a lighting condition to adjust white balance. The method of adjusting white balance according to the present invention may be used in the manual white balance control mode among the above modes. The method of adjusting white balance used in the manual white balance control mode will be described with reference to embodiments below.

Figure 5:
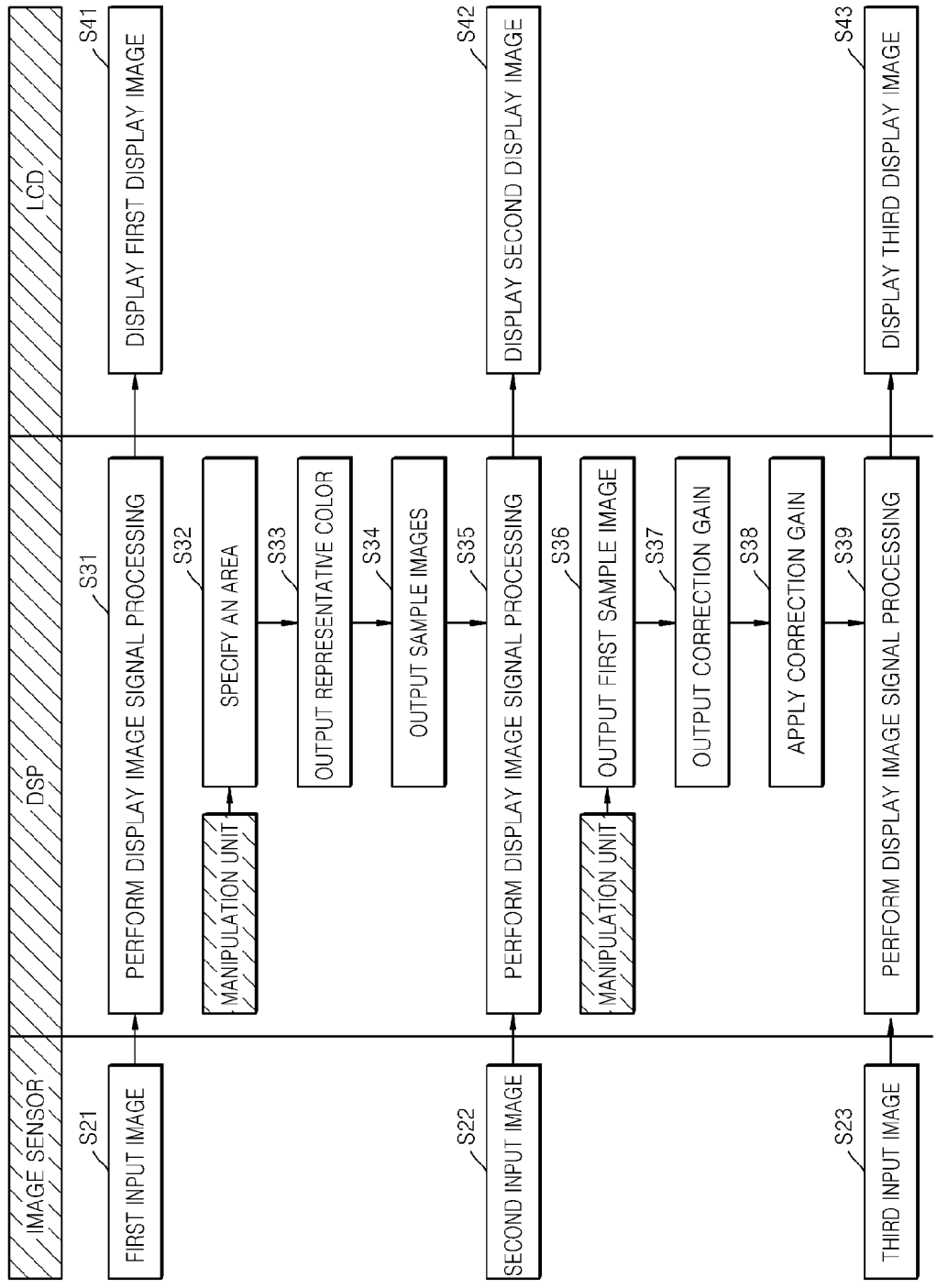
FIG. 5 is a flowchart illustrating a method of adjusting white balance in the digital camera illustrated in FIG. 1, according to an embodiment of the present invention.

FIG. 5 is a flowchart illustrating a method of adjusting white balance in the digital camera illustrated in FIG. 1, according to an embodiment of the present invention. Operations of the method of adjusting white balance performed in each of the elements of the digital camera such as an image sensor, a DSP, a LCD, and a manipulation unit will be described individually, but the present invention is not limited thereto.

Referring to FIG. 5, light reflected from a subject is received in the image sensor, thereby generating an input image. A first input image, a second input image, and a third input image may be sequentially generated in operations S21, S22, and S23, respectively.

The DSP may generate a first display image by performing display image signal processing on the first input image in operation S31 and display the first display image on the LCD in operation S41.

The user may check the first display image through the LCD and select an area of the first display image via the manipulation unit. The DSP may specify the area of the first display image selected by the user in operation S32 and output a representative color that occupies a largest surface area of the area in operation S33. Then the DSP may output sample images displaying various color sensitivities of the representative color in operation S34. That is, various correction gains may be applied to the area of the first display image displaying the representative color to output sample images.

In operation S35, the DSP may perform display image signal processing on a second input image and the output sample images and the second input image to generate a second display image and supply the second display image to the LCD. Then the second display image may be displayed on the LCD in operation S42.

The user may check the sample images of the second display image through the LCD. Then the user may select one of the sample images. For example, the user may select a first sample image through the manipulation unit to output the first sample image from the DSP in operation S36 and output a correction gain corresponding to the output first sample image in operation S37. Then the correction gain output may be applied with respect to the third input image in operation S38 and a third display image including an image to which display image signal processing is performed may be generated in operation S39. Then the third display image may be displayed on the LCD in operation S43. Accordingly, the user may obtain the third display image including the image having desired color sensitivity.

Next, after adjusting white balance with desired color sensitivity, the user may proceed photographing by adjusting the focus on a subject and pressing a shutter button. Thus, an image having color sensitivity desired by the user can be obtained.

Figure 6:
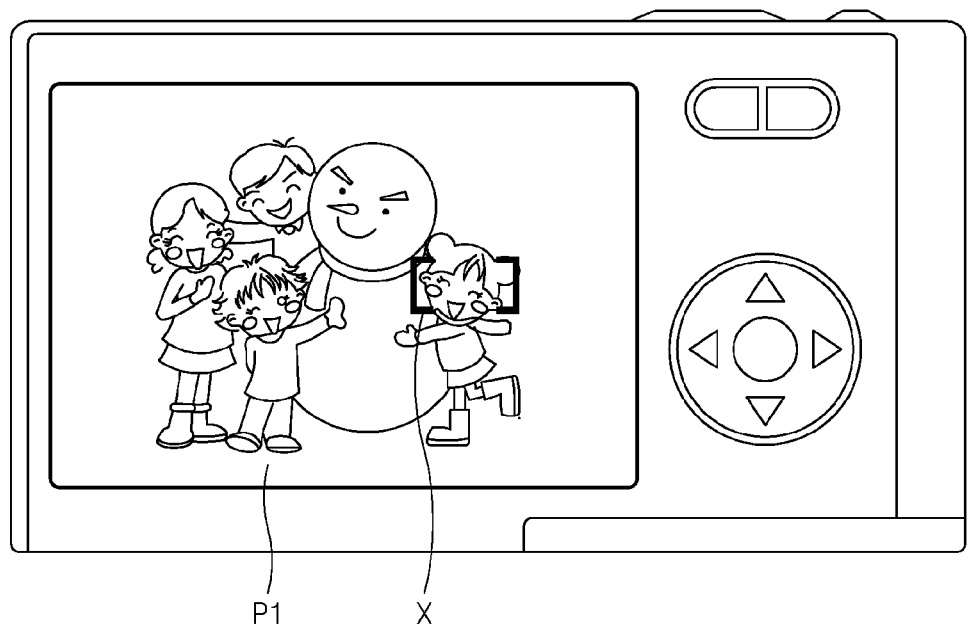
FIGS. 6 through 8 are schematic views illustrating display images displayed in the digital camera according to the method described with reference to FIG. 5.
Figure 7:
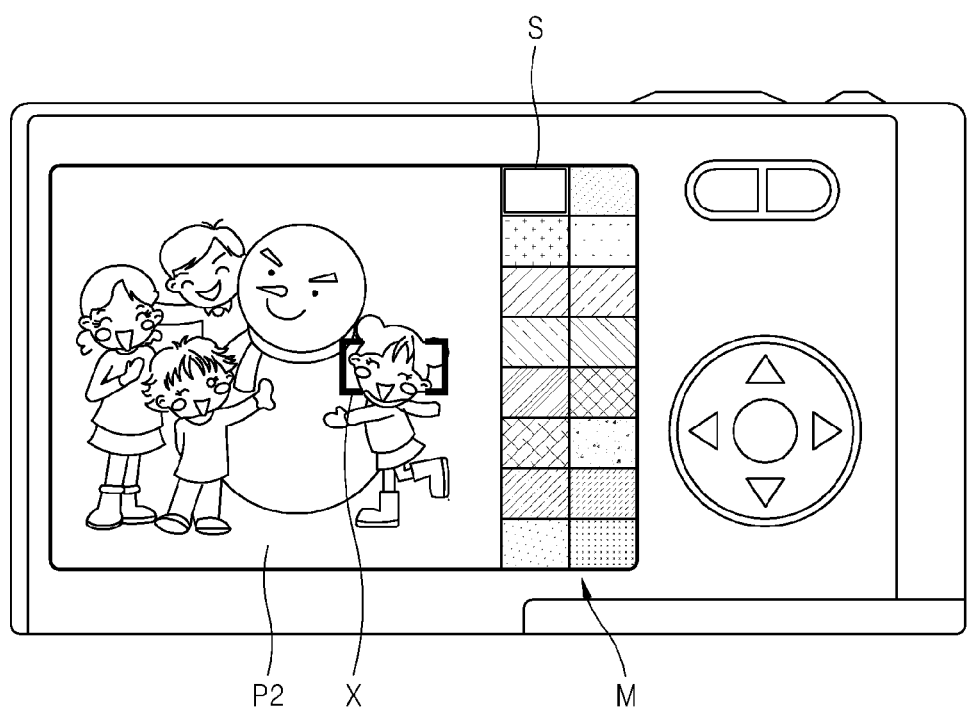
Figure 8:
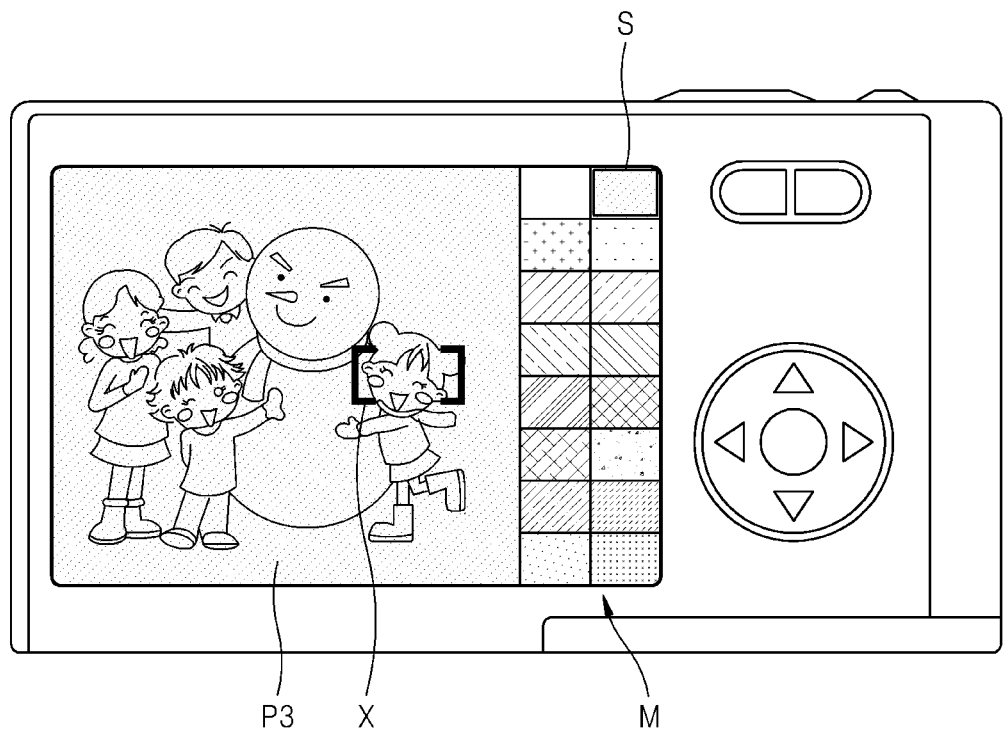

FIGS. 6 through 8 are schematic views illustrating a rear side of the digital camera on which a first display image P1, a second display image P2, and a third display image P3 are displayed according to the method described with reference to FIG. 5.

Referring to FIG. 6, the first display image, P1 is displayed on the LCD. An area X of the first display image P1 may be specified.

Referring to FIG. 7, the second display image P2 including sample images M showing various color sensitivities of the representative color of the selected area X and an input image are displayed. The sample images M may be displayed in a matrix manner, and a selection window S for specifying each of the sample images M may also be displayed together with the sample images M. The user may select one of the sample images M by moving the selection window S.

Referring to FIG. 8, by moving the selection window S to the right, a sample image in an upper right section is selected, and the third display image P3, including an image obtained by applying a correction gain corresponding to the selected sample image to the third input image, may be displayed. The third display image P3 also includes the sample image M arranged in the matrix manner.

Figure 9:
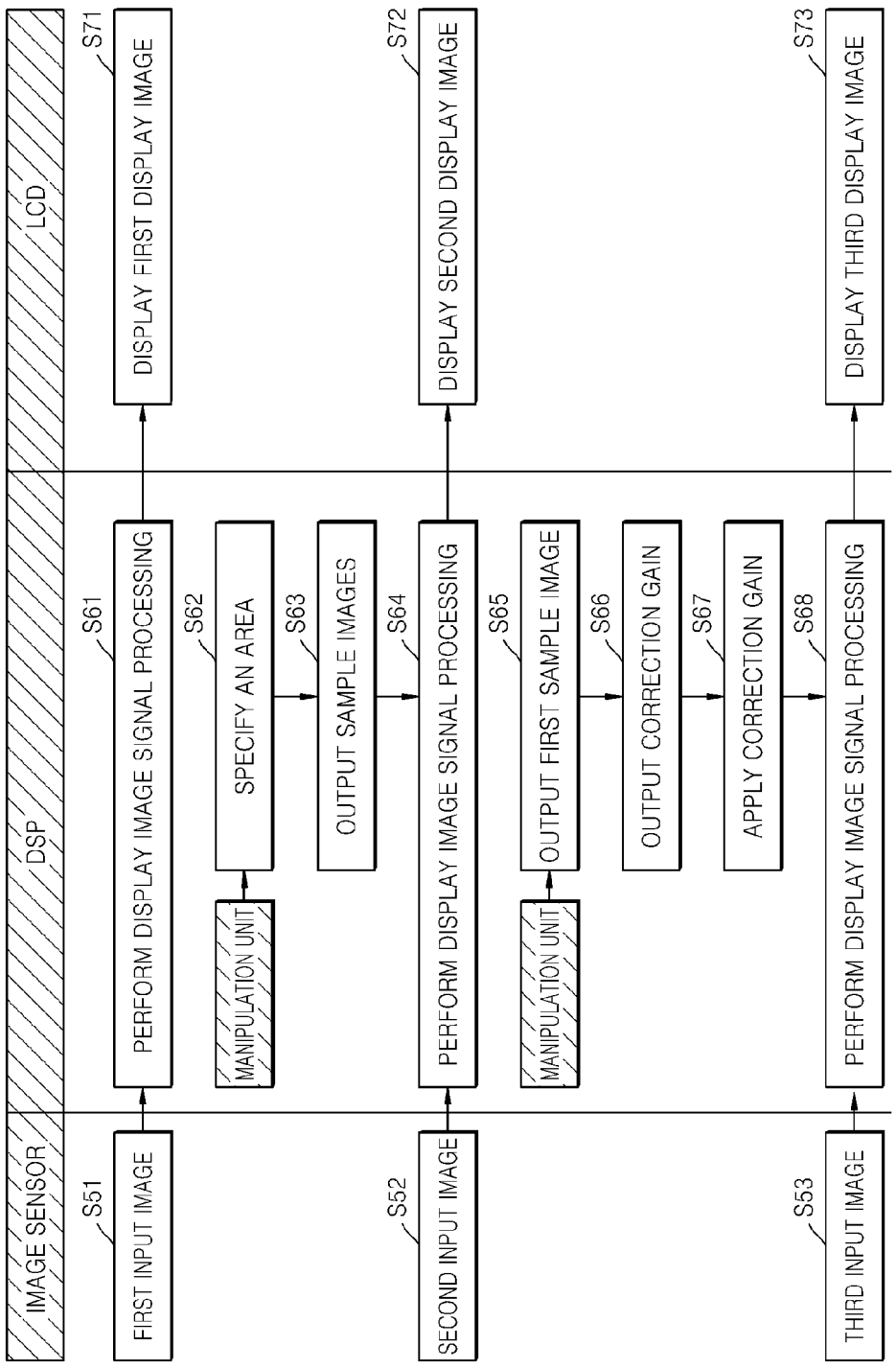
FIG. 9 is a flowchart illustrating a method of adjusting white balance in the digital camera illustrated in FIG. 1, according to another embodiment of the present invention.

FIG. 9 is a flowchart illustrating a method of adjusting white balance in the digital camera illustrated in FIG. 1, according to another embodiment of the present invention. Operations of the method of adjusting white balance performed in each of the elements of the digital camera such as an image sensor, a DSP, a LCD, and a manipulation unit will be described individually, but the present invention is not limited thereto.

Referring to FIG. 9, the image sensor sequentially generates a first input image, a second input image, and a third input image in operations S51, S52, and S53, respectively.

Then in operation S61, display image signal processing is performed to the first input image in the DSP to generate a first display image. In operation S71, the first display image may be displayed on the LCD.

In operation S62, the user may input a control signal through the manipulation unit, and in the DSP, an area of the first display image may be specified according to the control signal. In operation S63, a plurality of sample images having various color sensitivities with respect to the area of the first display image may be output using the DSP. In operation S64, display image signal processing is performed to the second input image and the output sample images to generate a second display image, and in operation S72, the second display image may be displayed on the LCD.

In operation S65, the user inputs a control signal for selecting one of the sample images of the second display image through the manipulation unit, and outputs a first sample image in the DSP accordingly. In operation S66, a correction gain corresponding to the first sample image is output, and in operation S67, the output correction gain is applied to the third input image to adjust white balance. In operation S68, display image signal processing is performed to the third input image to which white balance is adjusted to generate a third display image, and the third display image is provided to the LCD. In operation S73, the third display image may be displayed on the LCD.

Figure 10:
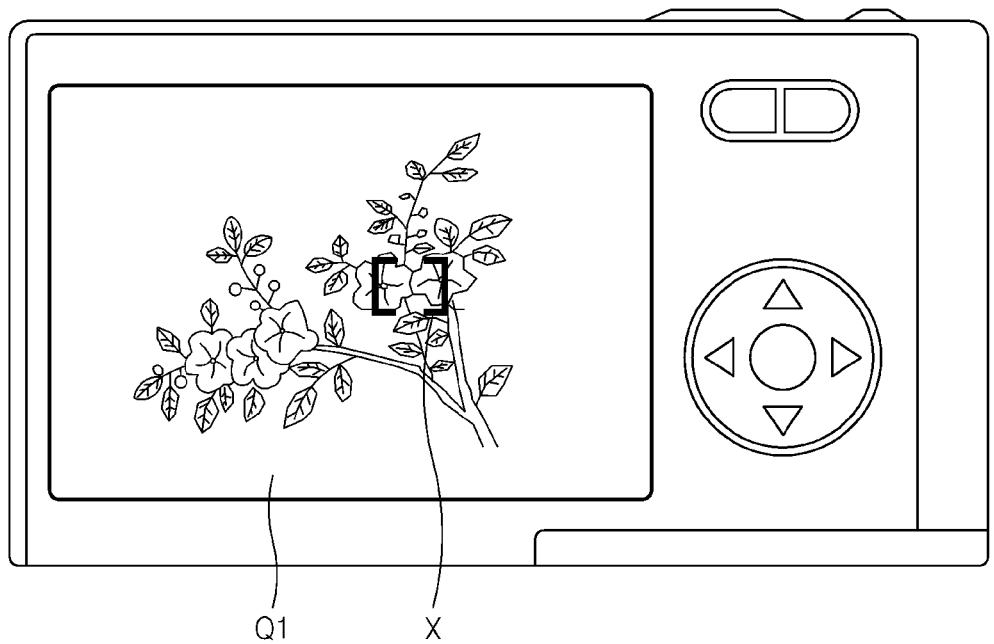
FIGS. 10 through 12 are schematic views illustrating display images displayed in the digital camera according to the method described with reference to FIG. 9.
Figure 11:
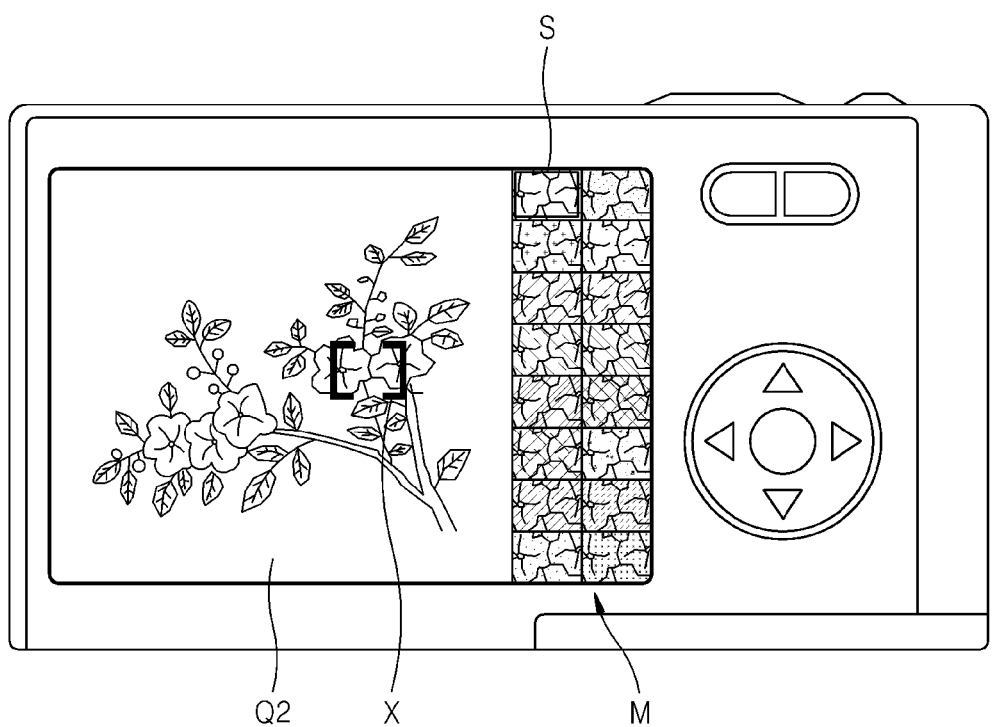
Figure 12:
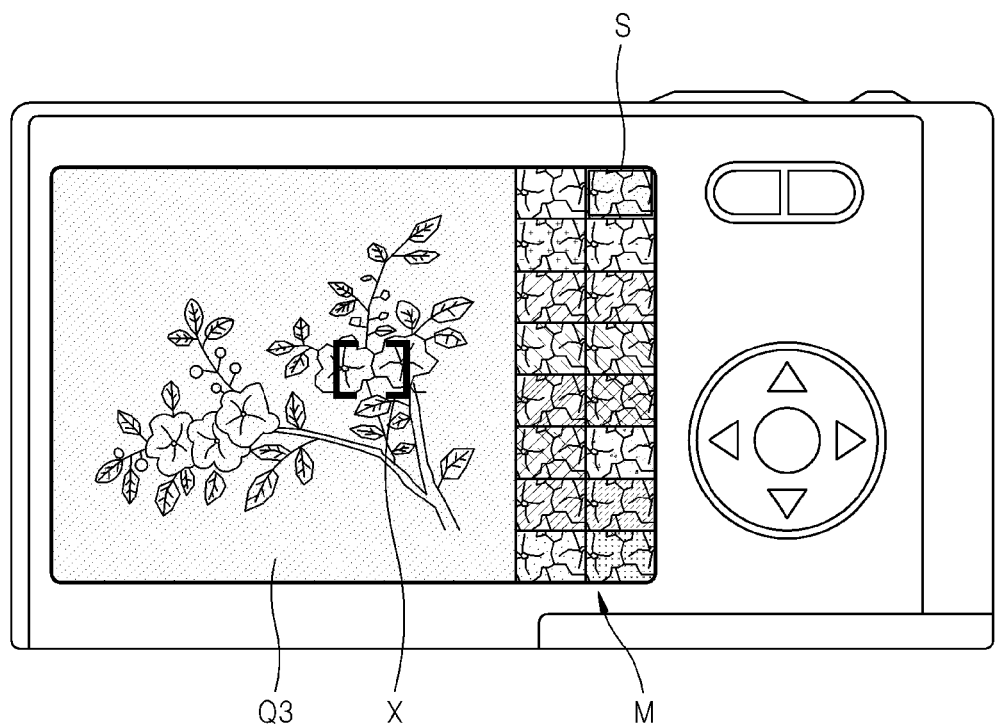

FIGS. 10 through 12 are schematic views illustrating a rear side of the digital camera on which a first display image Q1, a second display image Q2, and a third display image Q3 are displayed according to the method described with reference to FIG. 9. In detail, FIG. 10 illustrates a rear side of the digital camera displaying the first display image Q1. Referring to FIG. 10, an area X of the first display image Q1 may be specified.

FIG. 11 illustrates the second display image Q2 including a plurality of sample images M resulted by applying various correction gains to the specified area X and an input image.

FIG. 12 illustrates the third display image Q3. A sample image in a right upper section among the sample images M arranged in a matrix manner is selected using the selection window S. Then a correction gain applied to the selected sample image is applied to a third input image to perform white balance. Thus the third display image Q3 includes an image to which white balance is adjusted. The third display image Q3 may also include the sample images M.

According to the present invention, white balance can be manually adjusted by using a subject to be photographed, thereby easily performing a manual white balance control mode.

Also, according to the present invention, white balance is adjusted for other colors than white, and thus the user can obtain images having desired color sensitivity.

In general, an apparatus for performing the method of adjusting white balance according to the embodiments of the present invention may be implemented using any general purpose computing device or devices. Any of the computing devices may comprise a processor, a memory for storing program data and executing the program data, a permanent storage such as a disk drive, a communications port for handling communications with external devices, and user interface devices, including a display, keyboard, mouse, etc. When software modules are involved, these software modules may be stored as program instructions executable on the processor on a computer-readable storage medium, where the program instructions stored on this medium can be read by the computing device, stored in the memory, and executed by the processor. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computing devices so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A method of adjusting white balance, the method comprising:
    generating a display image by performing display image signal processing on an input image;
    outputting a representative color having a largest surface area of a selected area of the display image, the representative color output by a digital signal processor based on determining a color occupying the largest surface area of the selected area;
    simultaneously displaying at least two sample images corresponding to the selected area of the display image by applying different correction gains to the selected area of the display image that displays the output representative color, the at least two sample images being stored in a database; and
    applying the correction gain that is applied to a selected one of the at least two sample images to the input image.

2. The method of claim 1, further comprising:
    performing display image signal processing on a first input image to generate and display a first display image;
    simultaneously displaying at least two sample images corresponding to a selected area of the first display image by applying different correction gains to the selected area of the first display image; and
    performing display image signal processing on a second input image and the at least two sample images to generate and display a second display image.

3. The method of claim 2, further comprising applying the correction gain to a third input image to generate a third display image.

4. The method of claim 1, further comprising selecting the one of the at least two sample images.

5. The method of claim 1, wherein the at least two sample images are output from a database in which a plurality of sample images to which different correction gains are applied with respect to an image having a plurality of colors are stored.

6. A non-transitory computer readable storage medium having stored thereon a computer program executable by a processor for performing a method of adjusting white balance, the method comprising:
    generating a display image by performing display image signal processing on an input image;
    outputting a representative color having a largest surface area of the selected area of the display image, the representative color output by a digital signal processor based on determining a color occupying the largest surface area of the selected area;
    simultaneously displaying at least two sample images corresponding to the selected area of the display image by applying different correction gains to the selected area of the display image that displays the output representative color, the at least two sample images being stored in a database; and
    applying the correction gain that is applied to a selected one of the at least two sample images to the input image.

7. The computer readable storage medium of claim 6, wherein the method further comprises:
    performing display image signal processing on a first input image to generate and display a first display image;
    simultaneously displaying at least two sample images corresponding to a selected area of the first display image by applying different correction gains to the selected area of the first display image; and
    performing display image signal processing on a second input image and the at least two sample images to generate and display a second display image.

8. The computer readable storage medium of claim 7, wherein the method further comprises applying the correction gain to a third input image to generate a third display image.

9. The computer readable storage medium of claim 6, wherein the method further comprises selecting the one of the at least two sample images.

10. A white balance adjusting apparatus comprising:
    a digital signal processor including:
        a display image processing unit that performs display image signal processing on an input image to generate a display image;
        a representative color outputting unit that outputs a representative color having a largest surface area of a selected area of the display image, the representative color output based on determining a color occupying the largest surface area of the selected area;
        a sample image output unit that simultaneously displays at least two sample images corresponding to the selected area of the display image to which different correction gains are applied with respect to the selected area of the display image the at least two sample images being stored in a database; and
        a white balance adjusting unit that applies the correction gain that is applied to a selected one of the at least two sample images to the input image.

11. The white balance adjusting apparatus of claim 10, further comprising an imaging device that inputs the input image.

12. The white balance adjusting apparatus of claim 11, wherein the imaging device inputs a first input image, and the display image processing unit performs display image signal processing on the first input image to generate a first display image.

13. The white balance adjusting apparatus of claim 12, wherein the imaging device inputs a second input image, and the display image processing unit performs display image signal processing on the second input image and the sample images to generate a second display image.

14. The white balance adjusting apparatus of claim 13, wherein the imaging device inputs a third input image, and the white balance adjusting unit applies the correction gain to the third input image, and the display image processing unit performs display image signal processing on the third input image, to which the correction gain is applied, to generate a third display image.

15. The white balance adjusting apparatus of claim 10, further comprising a display unit that displays the display image.

16. The white balance adjusting apparatus of claim 10, further comprising a database in which a plurality of sample images, to which different correction gains are applied with respect to an image having a plurality of colors, are stored.

17. The white balance adjusting apparatus of claim 16, wherein the sample image output unit outputs the at least two sample images from the database.

18. The method of claim 1, further comprising simultaneously displaying the at least two sample images, the display image, and an outline corresponding to the selected area.

19. A method of adjusting white balance, the method comprising:
 generating a display image by performing display image signal processing on an input image;
 outputting a representative color having a largest surface area of a selected area of the display image;
 simultaneously displaying at least two sample images corresponding to the selected area of the display image by applying different correction gains to the selected area of the display image that displays the output representative color, wherein the at least two sample images are output from a database in which a plurality of sample images to which different correction gains are applied with respect to an image having a plurality of colors are stored; and
 applying the correction gain that is applied to a selected one of the at least two sample images to the input image.

20. A white balance adjusting apparatus comprising:
 a display image processing unit that performs display image signal processing on an input image to generate a display image;
 a representative color outputting unit that outputs a representative color having a largest surface area of a selected area of the display image;
 a database in which a plurality of sample images, to which different correction gains are applied with respect to an image having a plurality of colors, are stored;
 a sample image output unit that simultaneously displays at least two sample images corresponding to the selected area of the display image to which different correction gains are applied with respect to the selected area of the display image; and
 a white balance adjusting unit that applies the correction gain that is applied to a selected one of the at least two sample images to the input image.

21. The white balance adjusting apparatus of claim 20, wherein the sample image output unit outputs the at least two sample images from the database.

* * * * *